UNITED STATES PATENT OFFICE.

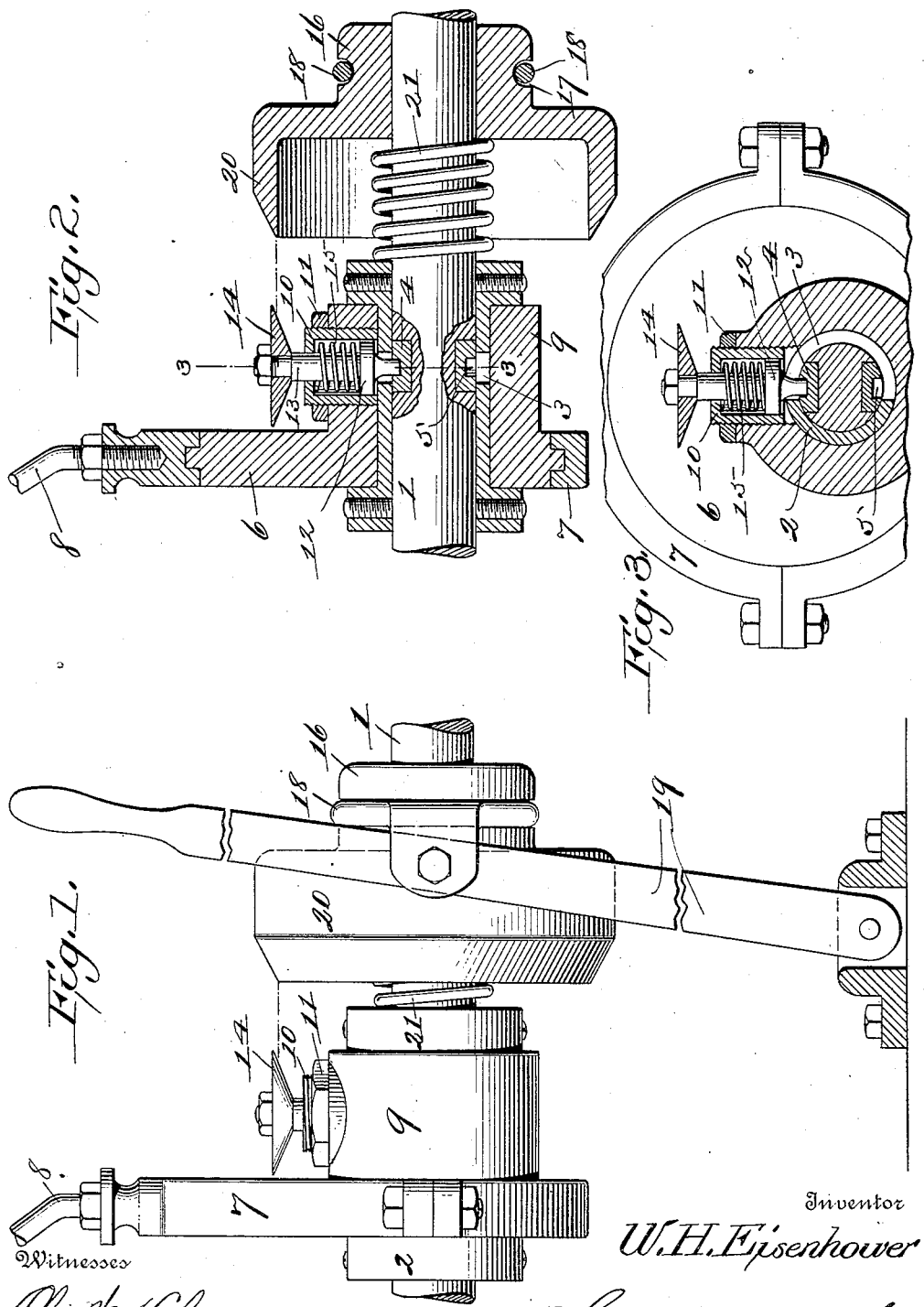

WILLIAM H. EISENHOWER, OF READING, PENNSYLVANIA.

REVERSING MECHANISM.

1,041,985.  Specification of Letters Patent.  Patented Oct. 22, 1912.

Application filed May 29, 1911. Serial No. 630,053.

*To all whom it may concern:*

Be it known that I, WILLIAM H. EISENHOWER, a citizen of the United States, and a resident of Reading, in the county of Berks and State of Pennsylvania, have invented a new and useful Improvement in Reversing Mechanism, of which the following is a specification.

This invention relates to a reversing mechanism which can be employed in connection with either vertical or horizontal engines, and the object of the invention is to simplify the mechanism at present employed and to accomplish the reversal of the engine by means of one eccentric instead of employing two eccentrics and the additional connections made necessary thereby.

The invention consists of the novel features of construction hereinafter described, pointed out in the claims and shown in the accompanying drawings, in which:

Figure 1 is a side elevation of the reversing mechanism, a portion of an engine shaft and a valve stem being broken away. Fig. 2 is a longitudinal vertical section. Fig. 3 is a section on the line 3—3 of Fig. 2.

In these drawings I have shown the parts in the position occupied in connection with a vertical engine, but it will be of course understood that the device can be readily adapted for use in connection with a horizontal engine.

In these drawings 1, represents the engine shaft upon which is fixed a flanged collar 2, which collar is provided with a semi-annular slot 3. Hardened metal plates 4, are set into the shaft 1, and upon opposite sides of the shaft and said plates have sockets 5, which register with the lot 3, of the collar. Mounted upon the collar and between the flanges thereof is an eccentric 6, provided with the usual eccentric strap 7, and rod or valve operating stem 8. The eccentric 6, is also provided with a hub portion 9, into which is threaded a casing or sleeve 10, locked in place by a suitable jam nut 11. Slidably mounted in the sleeve 10, is a pin 12, which is adapted to pass through the slot 3, of the sockets 5. This pin is provided with a stem 13, which projects loosely through the top of the sleeve and is provided upon its upper end with a head 14 beveled upon the under side. A suitable spring 15, arranged within the sleeve and bearing upon the pin holds it normally in one of said sockets, thereby locking the eccentric 6, to the shaft 1. Loosely mounted also upon the shaft is a slidable clutch 16, provided with a groove 17, in which rests the arms 18, of a clutch operating lever 19. The clutch is provided with a beveled, annular flange 20, which, when the clutch is thrown into operative position is adapted to engage the beveled head 14, and lift the pin 12, clear of the shaft 1. A suitable spring 21, normally holds the clutch out of engagement with the head 14, and also disengages the clutch and returns it to normal position when the lever 19, is released.

Assuming that the engine is running with the parts in the position occupied in Fig. 2, and it is desired to reverse the engine the lever is drawn toward the eccentric, thus bringing the collar 16, into operative position and as soon as the pin has been lifted from the socket 5, in which it is shown as resting the eccentric will be disconnected and the shaft will turn loosely through one-half of a rotation. It will be understood that at this time the shaft is turning from left to right, when seen as in Fig. 3. This will bring the pin to the opposite end of the slot 3, and in the meantime the lever has been released, the spring 21 has thrown back the clutch, and the pin is thus provided to drop into the other socket 5, and which has now become the opposite one. This locks the eccentric upon the shaft and in a position 180 degrees from that previously occupied and the direction of the shaft is reversed. If now the clutch is again brought into play the direction of the rotation of the shaft, which is now from right to left, will again bring the pin to the end of the slot 3, and the parts will again be in a position which they were at first assumed to be in Fig. 2, and the shaft will again rotate in its original direction.

What I claim is:—

1. The combination with a shaft having pin receiving sockets, of an eccentric mounted loosely upon the shaft, and a pin carried by the eccentric and adapted to seat alternately in said sockets.

2. The combination with a shaft having oppositely locked pin receiving sockets, of an eccentric mounted loosely upon the shaft, and a spring pressed pin carried by the eccentric and adapted to engage said sockets.

3. The combination with a shaft having pin receiving sockets, of an eccentric mounted loosely on the shaft, a pin carried by the eccentric and adapted to engage said sockets, and means for disengaging the pin from the sockets.

4. The combination with a shaft, an eccentric mounted loosely thereon and having pin receiving sockets, a pin carried by the eccentric adapted to alternately engage said sockets, means for disengaging the pin from a socket, and means for limiting rotation of the shaft with respect to said pin.

5. The combination with a shaft having pin receiving sockets, a slotted collar locked to said shaft, an eccentric mounted loosely upon the collar, a pin carried by the eccentric and working through the slot of the collar adapted to engage the said pin and disengage the pin from a socket.

6. In a device of the kind described, a shaft having oppositely arranged sockets, a collar secured to the shaft and having a semi-annular slot, the slot registering with said sockets, an eccentric having a hub portion, said eccentric being loosely mounted upon the collar, a pin carried by the hub portion of the eccentric, said pin passing through the slot in the collar and normally seated in one of said sockets, a spring adapted to normally hold said pin in the socket, and manually operated means for engaging said pin and lifting the same out of the shaft socket, as and for the purpose set forth.

WILLIAM H. EISENHOWER.

Witnesses:
PAUL D. EISENHOWER,
S. E. YARNELL.

Copies of this patent may be obtained for five cents each, by addressing the "Commissioner of Patents, Washington, D. C."